Patented June 21, 1949

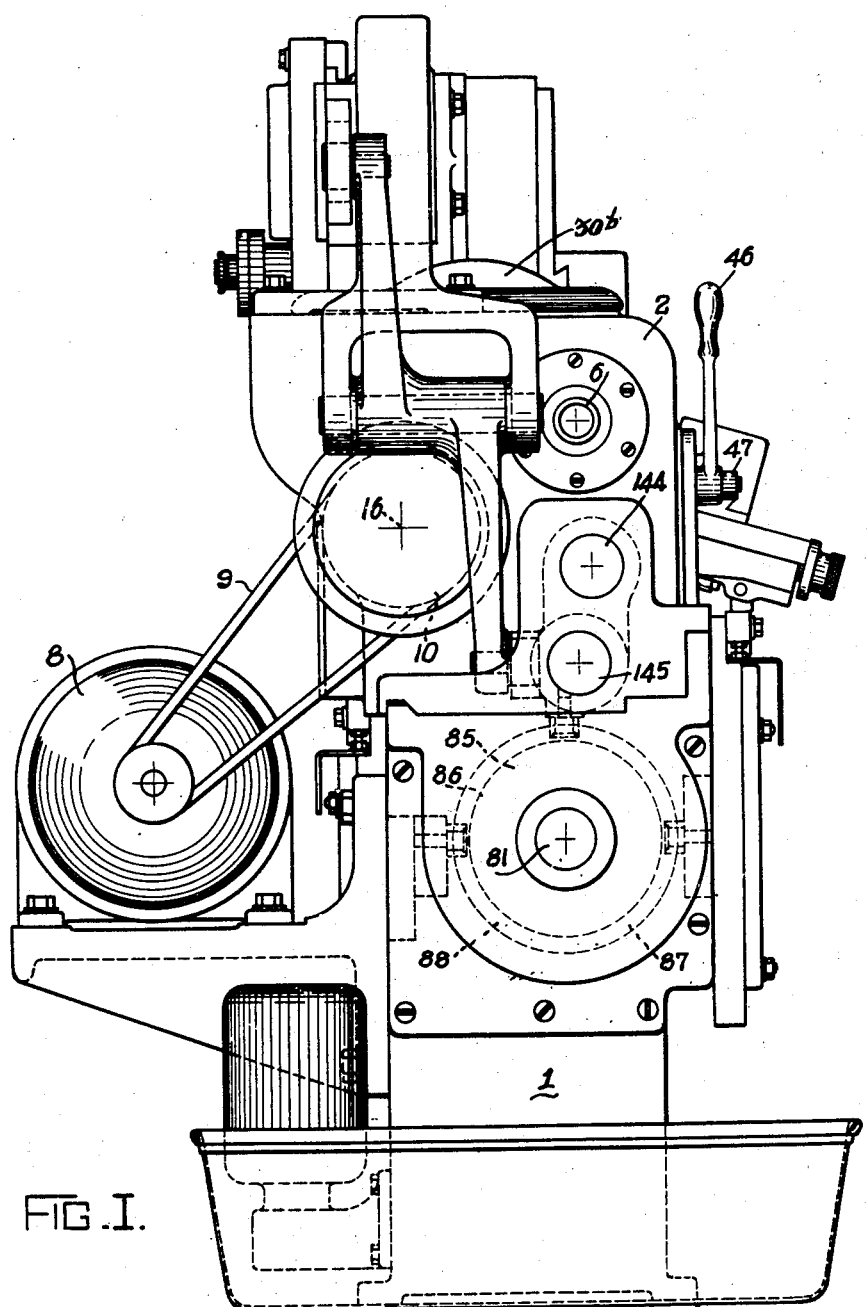
FIG. I.
INVENTORS.
WILLIAM F. GROENE
HARRY C. KEMPER
ATTORNEYS

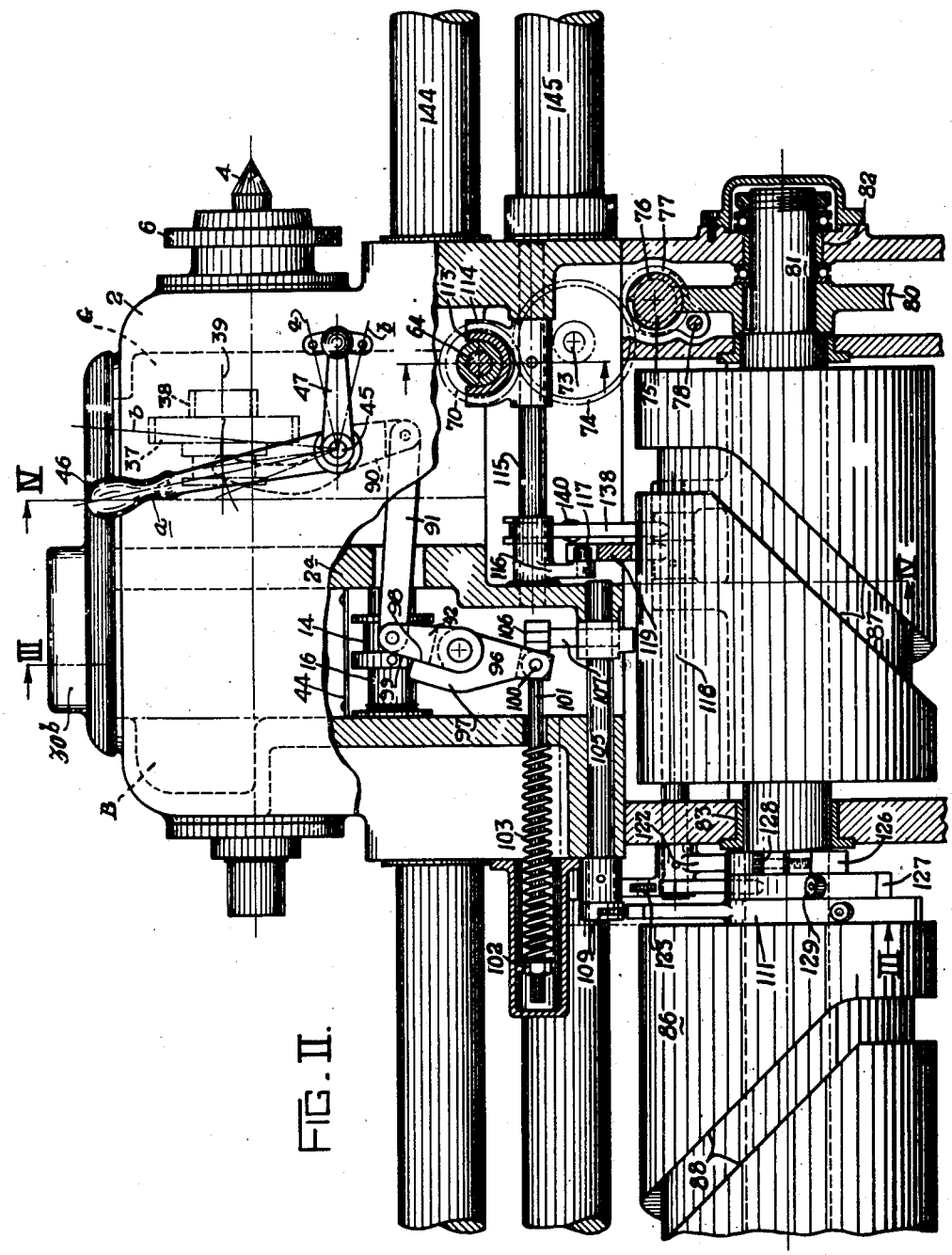
FIG. II.
INVENTORS.
WILLIAM F. GROENE
HARRY C. KEMPER
BY
Toulmin & Toulmin
ATTORNEYS

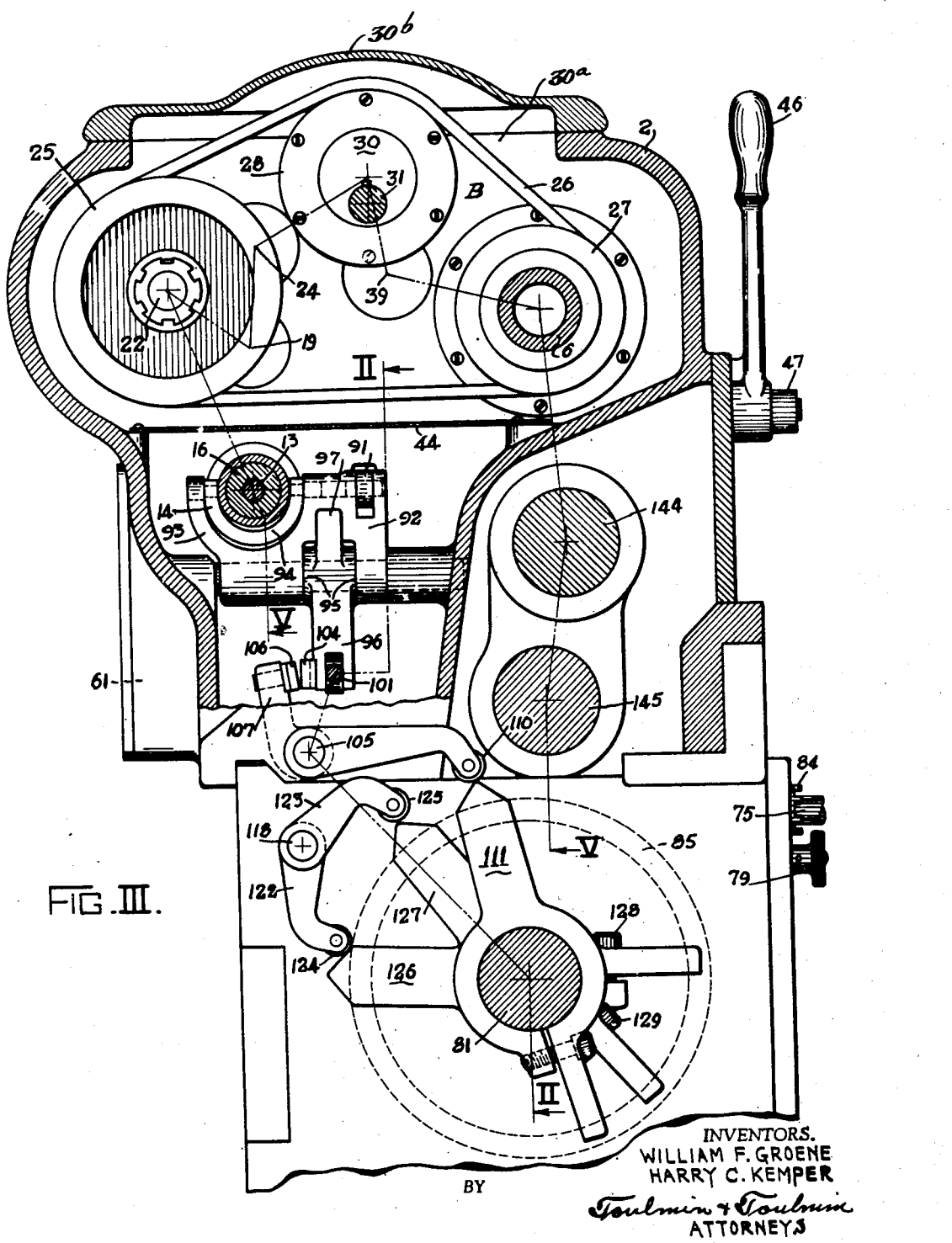

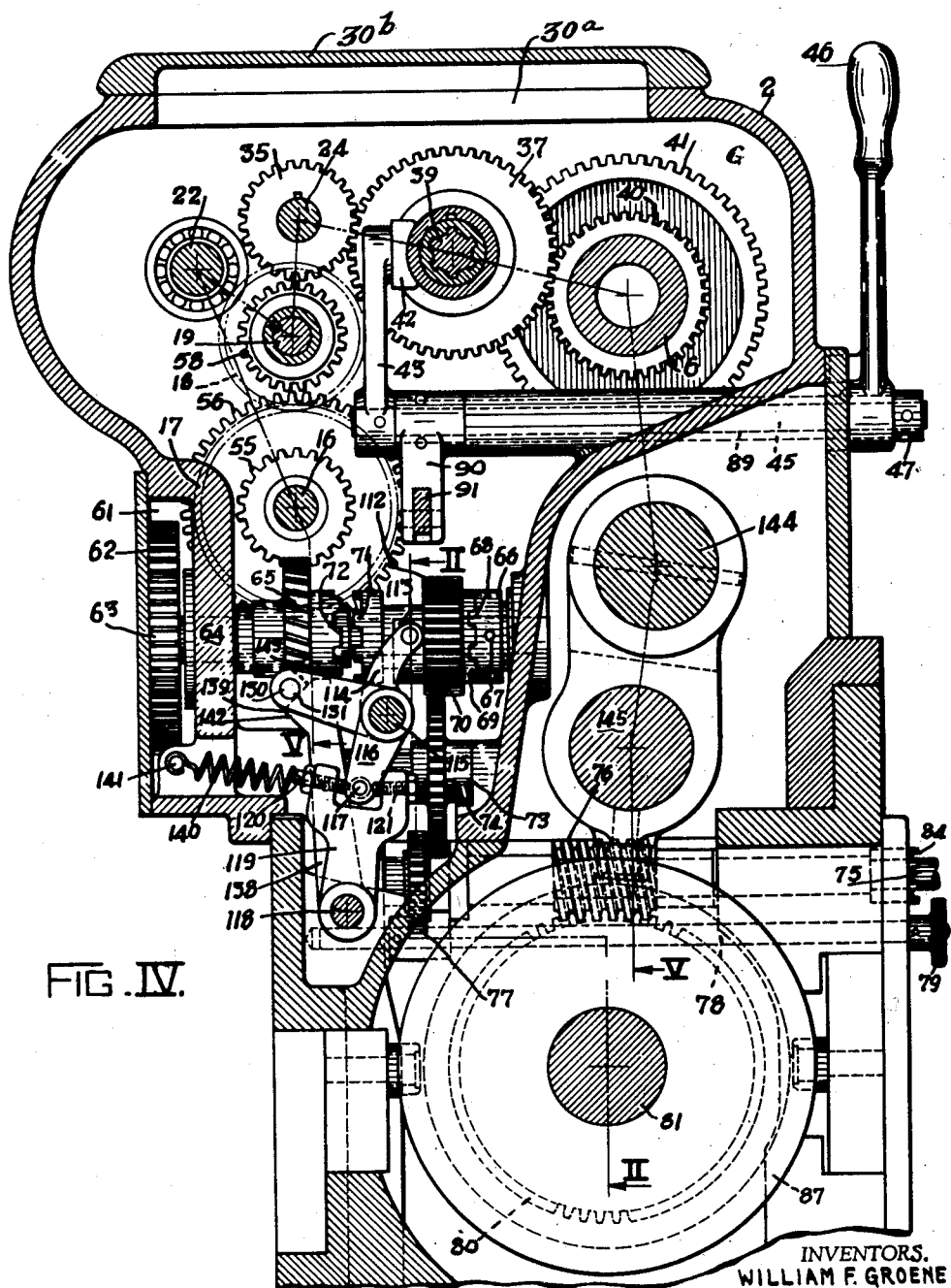
FIG. IV.

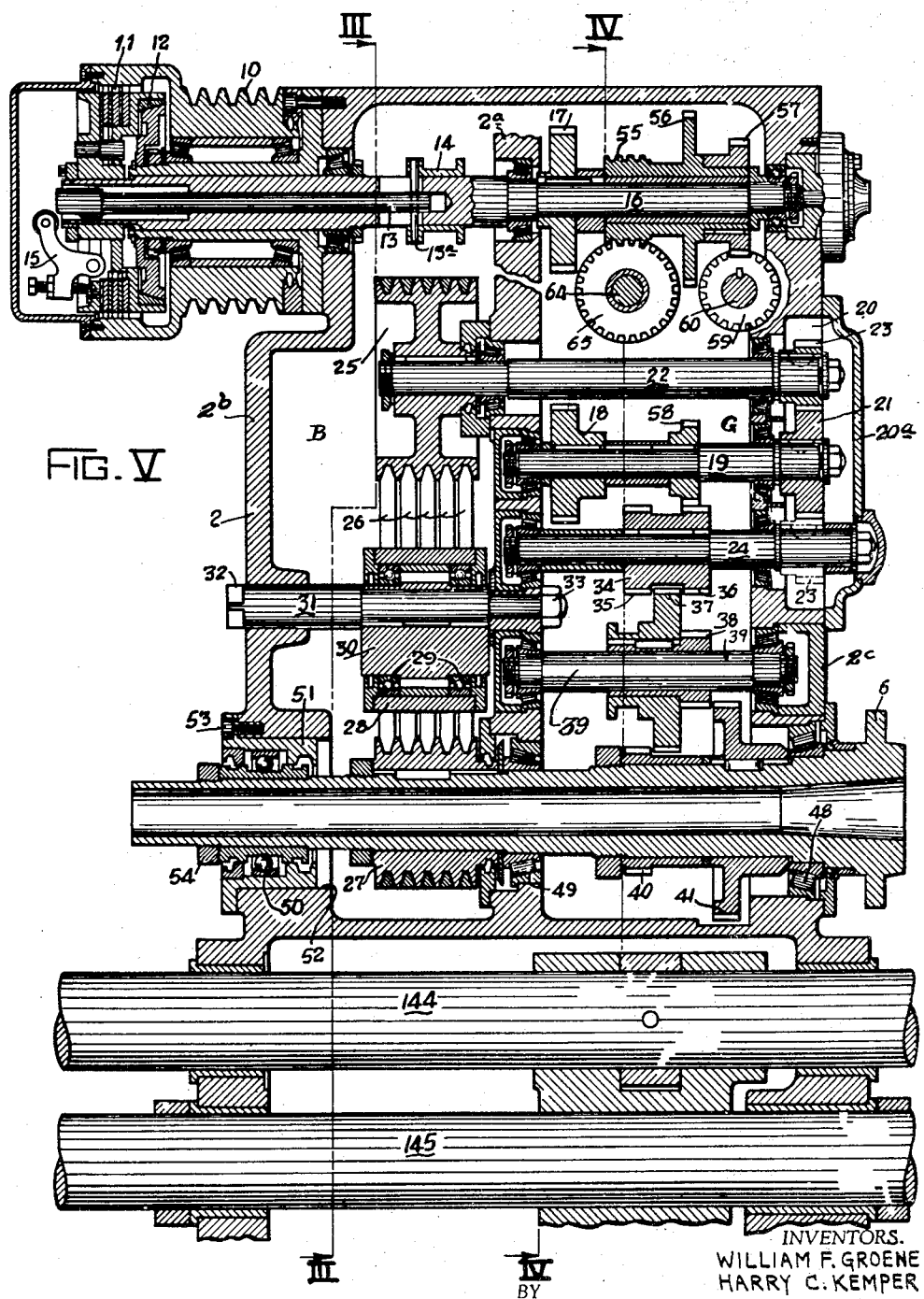

2,474,104

UNITED STATES PATENT OFFICE 2,474,104

DRIVE MECHANISM FOR AUTOMATIC LATHES

William F. Groene, Cincinnati, and Harry C. Kemper, Goshen Township, Clermont County, Ohio, assignors to The R. K. Le Blond Machine Tool Company, Cincinnati, Ohio, a corporation of Delaware Original application February 10, 1943, Serial No. 475,342. Divided and this application August 23, 1944, Serial No. 550,776

13 Claims. (Cl. 74—640)

This invention relates more particularly to the headstock of an automatic lathe incorporating a variable-speed gear drive transmission to the work spindle and a direct belt drive to the spindles to provide a wide range of speeds and, in addition, a smooth, vibrationless drive at high speed through the belt drive transmission to the lathe spindle. These drives are afforded in an integral headstock casing having a dividing partition providing two compartments, namely, a first lubricant-filled compartment for the gear drive transmission, and a second, dry compartment for the belt drive transmission. The entire headstock is an integral unit providing easy access whereby belts may be removed from the spindle and drive pulley without removing the work spindle from the headstock. At the same time, we provide a work spindle amply supported by bearings on each side of the driving pulley.

It is an object of our invention therefore, to provide in an integral unitary headstock for automatic lathes, alternate belt and gear drives from a common power source to a work spindle.

It is a further object to mount said alternate drives in separate compartments of the headstock whereby the gear drive may operate in a body of lubricant while the belt drive is kept dry.

Another object is to provide means whereby the work spindle belts may be removed and replaced easily while at the same time the work spindle pulley is supported in bearings on each side thereof.

Other objects and advantages of our invention will become apparent as the description proceeds.

Referring now to the drawing wherein like numerals are used to designate corresponding parts throughout the several views:

Figure I is an end elevation of an automatic lathe with our headstock incorporated therein, showing the driving motor and the relation of the drive shaft, work spindle, and other essential parts.

Figure II is a front elevation of the headstock, partly in section on line II—II, Figure IV.

Figure III is a section on line III—III, Figures II and V, showing the headstock compartment with belt drive.

Figure IV is a section on the line IV—IV of Figures II and V, showing the gear drive from drive shaft to work spindle.

Figure V is a diagrammatic view substantially along line V—V, Figure IV, to show the driving relationship between the several shafts, the change gears for shifting from belt to gear drive, and the clutch and brake mechanism between drive shaft and pulley.

Referring in detail to the drawings, the numeral 2 indicates in general the headstock of our lathe having a center 4 on which the workpiece is rotatably mounted at one end. Center 4 is carried by a work spindle 6 which, it will be understood, carries a suitable chucking device or work arbor for driving the work. A main driving motor 8 is mounted on a bracket at the back of the lathe, as shown in Figure I, and, through a series of belts 9, drives a clutch and brake pulley 10, Figure V.

Pulley 10 incorporates a driving clutch 11 and brake device 12. The clutch and brake are operated by a rod 13 slidable in an axial bore of a shaft 16, and shifted axially by a spool 14 having a pin 13a passing therethrough and also passing through an aperture in rod 13 and an axially-extending slot in shaft 16. At its other end rod 13 operates a conventional clutch and brake device of a character, for example, in Patent 1,474,112, dated November 13, 1923.

Below the cover plate 44 is located a shaft 16 on anti-friction bearings in the lower compartment and has a gear 17 fixed thereto, meshing with a gear 18, as indicated by the correspondingly numbered dot-and-dash pitch lines on Figure IV. These gears are shown separated in Figure V, it being understood that the latter figure is distorted to bring the axes of the various shafts into the plane of the paper. Gear 18 is fixed to a shaft 19 journaled in bearings supported by one end wall of headstock 2 and an intermediate wall 2a, Figure V. The right-hand end of this shaft, as seen in Figure V, extends in a change gear compartment 20 formed in the headstock wall and enclosed by a cover plate 20a. Shaft 19 has a gear 21 secured thereto within compartment 20. Gear 21 meshes with a change gear 23. Gear 23 is adapted to be detachably secured, within compartment 20, either to an end of belt drive shaft 22 or an end of shaft 24.

Shaft 22 has a belt pulley 25 fixed to its other end, as seen at Figures III and V. Belts 26 connect this pulley with a pulley 27, directly keyed to work spindle 6. These belts also pass over an idler pulley 28, mounted on bearings 29 carried by an eccentric bushing 30. Referring to Figure V, bushing 30 is fixed to an actuating stud 31 having a squared end 32 at the exterior of the housing 2. Thus, by applying a tool to, and turning stud 31, the pulley 28 may be shifted to tighten the belts. When gear 23 is on shaft 22, power from motor 8 is transmitted to shaft 16 and thence via gears 17, 18, shaft 19, gears 21, 23, shaft 22, belt pulley 25, belts 26 and pulley 27 to thus drive headstock work spindle 6.

Shaft 24 has a sleeve 34 keyed thereto. Said sleeve has spaced gears 35 and 36 at its ends as shown at Figure V. A splined shaft 39 is journaled parallel to shaft 24 and has a sliding gear unit thereon consisting of a relatively large gear 37, a smaller gear 38, and an actuating spool. Gear 37 is of a thickness to fit between without engaging either of gears 35 or 36 and at this time, shafts 24 and 39 are not connected.

The shaft 39 is provided with a spline or any other equivalent or convenient drive connection between the cluster gear 37—38 and the shaft 39 for the purpose of making sure that the cluster gear and shaft 39 rotate together on the antifriction bearings carried in the walls 2a and 2c of the headstock casing. If the gears 37—38 were just mounted on a cylindrical shaft 39 there would be a tendency for this gear to rotate on the steel shaft resulting in cutting and wear and the lack of use of the anti-friction bearings at the ends of the shaft. Therefore the use of splined shaft is the most economical and sure way of effecting proper axial sliding alignment of the gear 37—38 on the shaft 39 while making sure the shaft rotates in the anti-friction bearing in the headstock casing.

Work spindle 6 has a double gear element keyed thereto consisting of large and small gear elements 41 and 40. As may be seen from Figure V, the parts are so related that, when gear unit 37, 38 is slid to the left, large gear 37 is moved to mesh with and drivingly connect gears 35 and 40. This connection provides a relatively high speed connection from shaft 16, gears 17, 18, shaft 19, gears 21, 23, shaft 24, gears 34, 37 and 40, to work spindle 6.

On the other hand, when gear unit 37, 38, is slid to the right, gear 37 meshes with gear 36 on shaft 24 while companion gear 38 engages with large gear 41 on work spindle 6. At this time, the drive is by way of shafts 16 to 24 as previously traced, thence to gears 36, 37, 38 and 41 to work spindle 6. This provides a relatively slower speed than the one previously traced. Shifting of gear unit 37, 38 is effected by a shoe 42, Figure IV, pivoted on the end of a lever 43. This arm is fixed to a shaft 45 journaled in a sleeve attached to or integral with, the headstock casing 2. The shaft extends to the exterior of the casing at the front, and has a hand lever 47 attached thereto by which the gear unit may be axially slid. At its free end lever 47 carries a spring-pressed pin adapted to enter any one of three holes in a locking plate attached to a headstock casing. Each hole, of course, corresponds to a predetermined position of gear unit 37, 38, that is, to positions in which (1) gear 37 meshes with and connects gears 35 and 40, (2) gear 37 is free from and located between gears 35, 36 and out of mesh with gear 40 and (3), gear 37 engages gear 36 and gear 38 meshes with 41.

In this way by shifting gear 23 from one to the other of shafts 22 and 24, the work spindle 6 may be driven by belt transmission for the higher and smoother speeds required; or a gear drive may be used in case a relatively slower speed is needed; and in the latter case, the most appropriate of two speeds may be selected.

Referring to Figure V, it will be noted that work spindle 6 is journaled on a bearing 48 at its work-supporting end, a bearing 49 mounted in intermediate wall 2a and between the pulley 27 and the gear unit 40, 41. A third bearing 50 supports the spindle upon the other side of pulley 27. This bearing is carried in a demountable case 51 fitting a bore 52 in the outer rear wall 2b of headstock casing 2 and held in place by screws 53 and a lock nut 54 on spindle 6. When it is desired to change or renew belts 26, screws 53 and lock nut 54 are removed, and case 51, together with bearing 50 are slid off the end of the spindle. The bearing case 51 is sufficiently large so that, when removed, a circumferential space is left between the spindle 6 and the bore 52 through which belts 26 may be passed.

It will thus be apparent that when it is desired to remove the belts 26 from the driving pulley 25 on the shaft 22 and from the driving pulley 27 of the work spindle 6, the idler pulley 28 is removed by taking off the nut 33 from adjusting the shaft 31 and pulling this shaft out of the eccentric bushing 30 and from the headstock casing walls 2a and 2b. The idler pulley may then be lifted out through the opening 30a provided in the top of the casing 2 by taking off the cover 30b. Each of the belts 26 may then be lifted off of the pulley 25 and passed out through the opening in the rear wall 2b of the headstock casing 2 provided when the rear spindle bearing case 51 is removed. The work spindle 6 under these conditions remains in perfect operative alignment and in operative position on the bearings 48 and 49 carried in the walls 2c and 2a even though the bearing 50 has been removed from the rear portion of the work spindle.

Thus it can be seen that the headstock is provided with a separating partition 2a, Figure V, which provides a gear drive transmission compartment G formed by the front wall 2c in the headstock supporting the bearing 48 of the work spindle 6 and the intermediate wall 2a supporting the intermediate spindle bearing 49. A belt drive compartment B is provided between the intermediate wall 2a and the rear wall 2b of the headstock casing 2. Also, it will be further noted that the work spindle is adapted to be journaled in all three of these walls 2a, 2b, and 2c on the respective bearings 48, 49, and 50 during normal operation so as to give the necessary and proper rigidity to the work spindle while at the same time supporting the spindle on each side of the belt drive pulley 27 on the bearings 49 and 50 to maintain proper spindle alignment at all times when the belts 26 are applied to drive the spindle. The pulley drive shaft 22, however, is journaled only in the front wall 2c and the intermediate wall 2a of the headstock casing to allow the belt 26 to be readily lifted off the end of the pulley and past the shaft 22 and threaded out through the opening provided when the rear spindle bearing case 51 is removed.

Power is taken from the headstock drive shaft 16 to operate tool feeding mechanism of the lathe by a mechanism including a unitary composite gear consisting of a large gear 56, and spiral gear 57, journaled upon shaft 16. Shaft 19, previously described, carries a gear 58 which, as shown in Figure IV, meshes with and drives large gear 56. Spiral gear 57 drives a mating gear 59 carried on a shaft 60 journaled in casing 2. This shaft 60 extends into a change gear compartment 61 at the back of the headstock casing. A change gear 62 is mounted on shaft 60 in this compartment which gear meshes with a second change gear 63 mounted upon a shaft 64, as seen in Figure IV. By this arrangement, shaft 64 may be driven at a plurality of different relatively slow or feeding speeds by changing gears 62 and 63.

A spiral gear 65 is journaled on shaft 64 and meshes with spiral gear 55 so as to effect rapid traverse motion.

In order to selectively take off feeding motion from shaft 64, or rapid traverse motion from spiral gear 65, the arrangement shown in Figure IV is provided, comprising a clutch member 66 fixed to shaft 64 by pins 67 and having clutch teeth 68 which are adapted to engage mating teeth 69 of an output gear 70. This output gear 70 is journaled on shaft 64 and has a second set of clutch teeth 71 arranged to engage corresponding teeth 72 on gear 65.

Output gear 70 is axially shiftable on shaft 64 whereby one set of clutch teeth 69 may be engaged with 68 to thereby connect it to shaft 64, or the other set 71 engaged with teeth 72 on gear 65 to thereby couple said gear directly to spiral gear 65. Thus when output gear 70 is in its left hand position with reference to Figure IV, it is driven at a relatively rapid rate for traverse, while when it is in its right hand position, it is driven at relatively slower feeding speed.

A stud 73 is fixed in casing 2 and a gear 74 is journaled thereon, meshing with output gear 70. The latter is elongated so that the two gears mesh at all times despite axial shifting of gear 70 as described. A worm shaft 75 (Figure II) is journaled at the lower portion of the headstock casing and carries a worm 76 at its central part and a splined pinion 77 adjacent gear 74. Pinion 77 is thus slidably but non-rotatably mounted relatively to shaft 75, the parts being so dimensioned and positioned, that said pinion may be connected to, or disconnected from meshing relation with gear 74.

Sliding of pinion 77 is effected by means of a control rod 78, Figure IV, projecting through the front of the lathe base and provided with an operating knob 79.

Worm 76 meshes with and drives a worm wheel 80 fixed on cam drum shaft 81. The latter shaft is journaled in bearings 82 and 83 (Figure II) carried in the base of the machine. Worm shaft 75 carries a clutch element 84 at its end projecting at the front of the machine and adapted to be engaged by a crank handle so that shaft 75 may be rotated manually for effecting correct positioning of the work and tools prior to the start of the automatic machining cycle.

Cam drums 85 and 86 are mounted upon shaft 81. These drums are formed with slots 87 and 88, respectively, for actuating the various tool slides in the manner and for the purpose described in our application Serial No. 475,342, filed February 10, 1943, now Patent No. 2,410,026 dated October 29, 1946, of which the present case is a division.

*Control mechanism*

The various controls and adjustments of the machine are effected by parts whose operation will now be described. Referring particularly to Figures II, IV, and V, the control of driving clutch 11 on the input drive shaft 16 is accomplished by means of the lever 46. A sleeve 89 is mounted in the headstock on shaft 45 and lever 46 is fixed to this sleeve. At its end within the casing, the sleeve has a lever 90 pinned thereto. As shown in Figure II, a link 91 is pivoted at one end to the lower end of lever 90 and at its other end to another lever 92 best shown at Figure III. Lever 92 is mounted on a suitable pivot in the headstock and has a yoke portion 93 carrying a shoe 94 fitting the annular channel of clutch-actuating spool 14. The connections are such that when lever 46 is in position $a$, Figure II, the clutch 11 is open and the brake surfaces are in contact, while, when said lever is moved to position $b$, the clutch is closed and the brake released.

This operating lever and clutch 11 may be automatically tripped to stop the spindle 6 at a predetermined point in the work cycle by mechanism shown more particularly at Figure III. Lever 92 has a cut-away portion forming an opening, as shown at 95. A lever 96 fits within this opening. Levers 92 and 96 are pivoted upon the same pin bearing.

Lever 96 has an upwardly-projecting lug 97 a surface 98 of which is adapted to engage a surface 99 of lever 92, as seen in Figure II. Thus, as seen in said figure, lever 96 is free to rotate counter-clockwise without interference from lever 92. However, when lever 46 is in position $b$, Figure II and the clutch 11 is closed, rotation of lever 96 in a clockwise direction also engages and correspondingly rotates lever 92. This moves hand lever 46 to position $a$ and shifts spool 14 to open clutch 11 and apply brake 12.

A pin 100 at the lower end of lever 96 pivotally connects this lever to a rod 101 threaded at its free end to receive a nut 102. The rod 101 passes through an opening in the headstock casing wall. A spring 103 is mounted on the rod 101 and is compressed between nut 102 and the adjacent headstock wall, as seen in Figure II. The spring therefore acts to urge lever 96 in a clockwise direction of rotation.

Referring now to Figure III, a latch 104 is fixed to the lower end of lever 96 at one side thereof. A rock shaft 105 is journaled in the headstock wall on an axis normal to the pivot axis of lever 96 and has a lever 107 fixed thereto. Lever 107 carries at its free end a latch 106, so positioned as to normally engage latch 104 on lever 96 and thus hold lever 46 in position $b$, Figure II, wherein, it will be remembered, clutch 11 is closed. Rock shaft 105 has an arm 109 and roller 110, fixed thereon in position to be rocked by an actuating or trip arm 111 mounted on cam drum shaft 81. Said arm is adapted to be fixed to shaft 81 by a clamping screw 112.

As the machine is operated in an automatic cycle, shaft 81 is rotated and, at a predetermined point, arm 111 engages roller 110, rocks arm 109 and shaft 105 and thus moves latch 106 out of engagement with latch 104. As a result, lever 96 is freed and rocked by spring 103 so that lever 46 is shifted to position $a$, Figure II, clutch 11 is opened and the work brought to a rapid stop by brake 12. It will be noted that, as a result of the impositive connection between levers 92 and 96 by way of lug 97, lever 46 can be operated manually at any time to stop the machine in event of an accident or any incorrect operation thereof.

Feed and rapid traverse movements may be alternately applied to the cutting tool at a predetermined point in the cutting cycle of our invention. Referring particularly to Figure IV, it will be noted that output gear 70 has an annular groove 112 in which rides a shifting shoe 113 pivotally connected to a yoke 114. A rock shaft 115 is journaled in the forward and intermediate walls of the headstock casing. Yoke 114 is fixed to rock shaft 115. At its other end, shaft 115 has a downwardly-projecting arm 116 with a pin 117. Another rock shaft 118 (Figure IV), is journaled in headstock casing 2 and, as shown at Figure II, proceeds to the left to a position adjacent trip arms 126, 127. A forked lever 119 is fixed to this shaft. Each arm of the fork carries an adjusting screw 120 or 121 whose free ends provide a space receiving pin 117 between them. At its other end, rock shaft 118 has fixed to it a pair of levers 122, 123 each carrying a roller 124 or 125. As shown at Figure II, these levers 122 and 123 are in different planes normal to their supporting shaft 118 and are so arranged that, when roller 124 of lever 122 is engaged by its trip arm 126, shaft 118 is rocked clockwise as viewed in Figure III, while, when roller 125 of lever 123 is engaged by its trip arm 127, said shaft is rocked in a counterclockwise direction. Arm 126 is clamped to cam drum shaft 81 by a screw 128 while arm 127 is clamped to the same shaft by a screw 129; and it will be understood that all trip arms 111, 126 and 127 may be adjusted relatively to, and rigidly secured, in any desired circumferential position about their common shaft 81.

Thus as shaft 81 rotates, arm 126 will strike roller 124 at a desired point in the operation of our machine, to rock shaft 118 clockwise in Figure III, and, through lever 119, arm 116, shaft 115 and yoke 114, cause engagement between clutch teeth 71 and 72 to thus cause rapid traverse motion of shaft 81 and its cam drums 85 and 86. On the other hand, when arm 127 engages its roller 125, it moves lever 123 to rock shaft 118 counterclockwise and, through connections previously traced, shift output gear 70 to engage clutch teeth 68, 69 and thus effect a feeding motion of the shaft 81 and its cam drums 85 and 86.

It is desirable to effect transition from traverse to feeding motion and vice versa with a snap action so that shaft 81 shall be in motion at all times. For this purpose, our invention includes mechanism for rapidly shifting output gear 70 from one position to another. This mechanism includes a loose fit between shoe 113 and its accommodating groove in gear 70, as best seen at Figure IV. An arm 130 having a pin 131 at its end, is fixed on shaft 115 so as to rock therewith. A detent lever 138 having a detent point 139 is pivoted on shaft 118 and is normally urged into a position against pin 131 by means of a tension spring 140 attached to lever 138 at one end and to a pin 141 on the headstock casing at its other end.

Said detent lever 138 is shaped, as shown at Figure IV, so that, as shaft 115 is rocked to cause disengagement between the teeth of gear 70 and their mating sets of teeth on gear 65 or member 66, lost motion between shoe 113 and groove 112 permits pin 131 to ride a little beyond the point 139 in the direction it is moving. Thus, just as shoe 113 begins to engage the other side of groove 112, pin 131 begins to slide down one of the surfaces 142 or 143 in a snap action that immediately shifts output gear 70 to its other position. By this mechanism, shift of gear 70 is instantaneous and cam drums 85 and 86 together with trip arms 111, 126 and 127 are continuously kept in motion. Screws 120 and 121 are intended primarily to adjust and secure accurate positioning of the levers 122, 123 with respect to the gear 70 so as to provide the proper action of these members during the automatic operating cycle of the machine.

*Operation*

The operation of our invention will now be clear. Prior to starting the machine, the change gear 23 is positioned either upon shaft 22 if a high speed drive is desired, or upon shaft 24 if slower speeds are called for by the work to be operated upon. The arms 111, 126 and 127 are adjusted and secured circumferentially of their shaft 81. Arm 111 is adjusted to stop the machine at the desired point of the cutting tool along the work. Arms 126 and 127 are adjusted to the desired points of the tool relatively to the work at which a change from rapid to feeding traverse of the tool is desired, lever 47 is shifted to move gear element 37, 38 for the selected speed in event the gear drive is to be used instead of the belt drive. A workpiece is loaded into the lathe, the tool brought to position by manual cranking of shaft 75 if necessary, and the driving motor is started. Hand lever 46 is next thrown to position b, Figure II, to close clutch 11 and start rotation of the work. The shaft 81 and its drums 85 and 86 are now driven to properly feed the tool relatively to the work. At the proper times, as preselected, arms 126 and 127 engage their respective rollers 124 and 125, to rock forked lever 119 and effect rapid axial movement of gear 70 along shaft 64, as already explained, to shift from feeding to rapid traverse speeds. As the work is completed, actuating arm 111 engages and trips lever 107 thus releasing lever 96 and permitting spring 103 to act to open clutch 11, disconnect pulley 10 from drive shaft 16 and bring the work to a quick stop through the engagement of brake 12.

It will thus be seen that we have provided an automatic lathe with a very wide range of possible operations ranging from high speeds with belt drive, to heavy, slow-speed cutting. Where a surface, not necessary to be worked, is located between two surfaces to be finished, arms 126, 127 are effective to shift gear 70 to rapidly traverse the surface not to be worked, whereafter the gear is again shifted to resume the selected cutting speed. While the lathe is automatically and positively stopped at the completion of the workpiece, it may, nevertheless, be stopped instantaneously at any point merely by shifting lever 46 to its a position. In addition to the foregoing features, we have provided a lathe which is easily and quickly accessible for adjustment and, at the same time rugged, powerful and capable of the rapid production of work of unsurpassed accuracy.

Having thus described our invention, what we claim as new, and desire to secure by Letters Patent is:

1. In a headstock for lathes, a two compartment casing, a drive shaft journaled in said casing, a work spindle in said casing, a belt drive in one compartment of said casing connecting said shaft and spindle and including a pulley on said spindle, a gear drive in the other compartment connecting said shaft and spindle bearings in said casing journaling said spindle on both sides of said pulley, and a demountable means carrying one of said bearings in the casing so as to provide a space around said spindle through which belts on said pulley may be removed and replaced when said means is demounted.

2. In a headstock for lathes, a casing, end walls and an intermediate wall in said casing forming a pair of compartments therein, a gear drive transmission in one of said compartments, a belt drive transmission including a belt in the other of said compartments, means for applying power to drive said transmissions, a work spindle journaled in each of said walls, a pulley on said spindle in said belt drive compartment, a demountable rear bearing for said spindle removable to allow insertion or removal of said belt from said belt drive transmission out of said belt drive compartment.

3. In a headstock for lathes, a casing having three wall members forming a pair of compartments therein, a belt drive shaft journaled in two of said wall members, a work spindle journaled in all three of said wall members, a belt drive transmission including a belt interconnecting said belt drive shaft to said spindle in one of said compartments, a gear drive transmission connected to said spindle in the other of said compartments, means for applying driving power to said belt drive shaft or to said gear drive transmission, and a demountable means carrying one of the journals for said spindle in said walls so as to provide a space around said spindle through which said belt may be removed from or replaced in said compartment containing the belt drive transmission.

4. In a headstock for lathes, having a casing containing outside walls and an intermediate wall forming a pair of compartments therein, a drive shaft journaled in said intermediate and an outside wall of said casing, a work spindle journaled in said intermediate wall and the outside walls of said casing, a gear drive transmission connected to said work spindle located in one of said compartments, a belt drive transmission including a belt between said drive shaft and said spindle located in the other of said compartments, drive means for said transmissions, a demountable bearing means for said spindle in one of the outside walls of said casing forming the belt drive compartment removable to facilitate insertion and removal of said belt from said belt drive transmission without affecting journaled alignment of said work spindle in said casing.

5. In a headstock for lathes, a casing having end walls and an intermediate wall, a drive shaft journaled in an outside and an intermediate wall, a work spindle journaled in all three of said walls, a gear transmission located between said first mentioned outside and intermediate walls operatively connected to said work spindle, a belt drive transmission including a belt located between said intermediate wall and the other outside wall interconnecting said drive shaft and said work spindle, drive means connectable to said gear transmission and said drive shaft, means for removing the outside bearing for said spindle to facilitate installation or removal of said belt from said belt drive transmission.

6. In a headstock for lathes, a casing comprising a pair of end walls and an intermediate wall forming two isolated compartments in said casing, a work spindle journaled in each of said walls, a drive shaft journaled in two of said walls, a gear drive transmission located between said last mentioned two walls, a belt drive transmission between said drive shaft and said work spindle located between said intermediate wall and the other wall of said casing, means for demountable journaling said spindle bearing in said other wall so that it may be removed to facilitate insertion or removal of the belt of said belt drive transmission without affecting the position of said work spindle journaled in working position in said other two walls.

7. In a headstock for lathes, a casing having a front wall, a rear wall, and an intermediate wall formed integral therewith providing a pair of isolated compartments therein, a work spindle journaled in all three of said walls, a demountable bearing for said spindle in said rear wall, a drive shaft journaled in said front and intermediate walls, a gear drive transmission connected to said work spindle and located between said front and intermediate walls, a belt drive transmission interconnecting said drive shaft and said work spindle located between said intermediate wall and said rear wall, and means for applying power to drive said transmissions.

8. In a headstock for lathes having a casing, means in said casing forming a gear drive transmission compartment and a belt drive transmission compartment, a drive shaft journaled in said casing and extending across said gear drive compartment and projecting partially into said belt drive compartment, a work spindle journaled in said casing extending across both of said compartments, a gear transmission connected to said work spindle and located in said gear drive compartment, a belt drive interconnecting the projecting portion of said drive shaft with said work spindle, and removable bearing means for said work spindle associated with said belt drive compartment to allow the belt of said belt drive to be inserted in or removed from driving position between said drive shaft and said work spindle through an opening formed by the removal of said bearing from said work spindle.

9. In a headstock for lathes, a casing, means in said casing forming a pair of isolated compartments therein, a work spindle journaled in said casing and extending through both of said compartments, a drive shaft journaled in said casing extending through one of said compartments and projecting into the other of said compartments, a pulley on said spindle in said other compartment, a pulley on said drive shaft in said other compartment, belted driving means interconnecting said drive shaft and said pulley on said work spindle, and a gear drive transmission in said first mentioned compartment connected to said spindle, and an idler pulley in said other compartment for maintaining tension in said belt, and mounting means to allow removal of said idler pulley from said other compartment, and demountable bearing support means for said work spindle, removable to permit installation or removal of said belt from said other compartment without affecting the position of said spindle in journaled working position in said casing.

10. In a headstock for lathes, a casing, having a gear drive compartment and a belt drive compartment, a work spindle journaled to extend through both of said compartments, a gear drive transmission connectable to said work spindle in one of said compartments, a belt drive transmission including a belt connected to drive said spindle in the belt drive compartment, and removable bearing means for said work spindle associated with said belt drive compartment adapted to provide an access opening for inserting or removing said belt without affecting the position of said spindle in journaled working position with said gear drive transmission in said casing.

11. In a headstock for lathes, a casing, having a gear drive compartment and a belt drive compartment isolated therefrom, a work spindle journaled to extend through both of said compartments, a gear drive transmission connectable to said work spindle in one of said compartments, a belt drive transmission including a belt connected to drive said spindle in the belt drive compartment, removable bearing means for said work spindle associated with said belt drive compartment adapted to provide an access opening for inserting or removing said belt without affecting the position of said spindle in journaled working position in said casing, belt tightening idler pulley means in said belt drive compartment for maintaining tension on said belt, and means for removing said idler pulley from said compartment to facilitate insertion or removal of said belt through said opening provided by the removal of said removable bearing means.

12. In a headstock for lathes having a three bearing work spindle mounting, a pair of isolated compartments in said headstock each side of said intermediate bearing mounting for said work spindle, a gear drive to said work spindle in one of said compartments, a belt drive to said work spindle in said other compartment including a pulley fixed on said spindle between said intermediate bearing mounting and the rear bearing mounting of said work spindle, and demountable support means for said rear bearing mounting adapted for removal of said rear bearing mounting while said spindle is maintained in aligned working position on the remaining two bearing mountings to facilitate insertion or removal of the belt in said headstock for said belt drive transmission.

13. In a headstock for lathes having a work spindle mounted on three bearings, a belt drive transmission including a belt connected to said spindle by a pulley fixed on said spindle and located between the rear and intermediate bearings of said spindle, and means for removing said rear bearing to provide access space for inserting or removing the belt from said belt drive transmission, and gear transmission means connected to said spindle between said intermediate bearing and the front bearing of said spindle, and common drive means alternately adapted to drive said belt drive transmission or said gear drive transmission to rotate said work spindle.

WILLIAM F. GROENE.
HARRY C. KEMPER.

REFERENCES CITED

The following references are of record in the file of this patent:

UNITED STATES PATENTS

| Number | Name | Date |
|---|---|---|
| 804,740 | Lassiter | Nov. 14, 1905 |
| 934,105 | Steinle | Sept. 14, 1909 |
| 952,050 | Schatz | Mar. 15, 1910 |
| 1,390,905 | Head | Sept. 13, 1921 |
| 1,473,166 | Sundstrand | Nov. 6, 1923 |
| 1,564,216 | Doane | Dec. 8, 1925 |
| 1,602,724 | Thacher | Oct. 12, 1926 |
| 1,947,862 | Lucas et al. | Feb. 20, 1934 |
| 1,956,601 | Upton | May 1, 1934 |
| 2,078,196 | Heyer | Apr. 20, 1937 |
| 2,078,859 | Lapham | Apr. 27, 1937 |
| 2,110,173 | Pohl et al. | Mar. 8, 1938 |
| 2,169,761 | De Leeuw | Aug. 15, 1939 |
| 2,239,443 | Groene et al. | Apr. 22, 1941 |
| 2,279,710 | Kylin et al. | Apr. 14, 1942 |
| 2,338,121 | LeBlond et al. | Jan. 4, 1944 |